(12) United States Patent
Ren et al.

(10) Patent No.: US 7,481,952 B2
(45) Date of Patent: Jan. 27, 2009

(54) ELECTRICALLY CONDUCTIVE PTFE TAPE

(75) Inventors: Jiaxiang Ren, Houston, TX (US); Bernd Schulte-Ladbeck, Houston, TX (US)

(73) Assignee: Compagnie Plastic Omnium, Lyons (FR)

( * ) Notice: Subject to any disclaimer, the term of this patent is extended or adjusted under 35 U.S.C. 154(b) by 22 days.

(21) Appl. No.: 11/118,059

(22) Filed: Apr. 29, 2005

(65) Prior Publication Data

US 2005/0244650 A1  Nov. 3, 2005

Related U.S. Application Data

(60) Provisional application No. 60/566,632, filed on Apr. 29, 2004, provisional application No. 60/566,633, filed on Apr. 29, 2004.

(51) Int. Cl.
*H01B 1/12* (2006.01)

(52) U.S. Cl. .......... 252/511; 252/500; 252/510; 428/408; 524/496; 977/753; 977/742; 977/788

(58) Field of Classification Search .......... 252/500, 252/502, 511, 510; 428/421, 408; 174/36; 524/495; 977/753, 742, 788
See application file for complete search history.

(56) References Cited

U.S. PATENT DOCUMENTS

| | | | |
|---|---|---|---|
| 6,218,000 B1 * | 4/2001 | Rudolf et al. | 428/317.9 |
| 2003/0068550 A1 * | 4/2003 | Naoi et al. | 429/213 |
| 2003/0146418 A1 * | 8/2003 | Chacko | 252/511 |
| 2004/0039096 A1 * | 2/2004 | Patel | 524/401 |
| 2004/0217336 A1 | 11/2004 | Niu et al. | |
| 2005/0109522 A1 * | 5/2005 | Ysbrand | 174/36 |
| 2005/0173244 A1 | 8/2005 | Hayashi et al. | |
| 2005/0202233 A1 * | 9/2005 | Dove | 428/316.6 |
| 2006/0035081 A1 * | 2/2006 | Morita et al. | 428/408 |

FOREIGN PATENT DOCUMENTS

| | | | |
|---|---|---|---|
| DE | 4219636 | * | 12/1993 |
| EP | 0 860 834 A2 | | 8/1998 |
| JP | A-2003-187809 | | 7/2003 |
| WO | WO2004/059663 | * | 7/2004 |

\* cited by examiner

*Primary Examiner*—Lorna M Douyon
*Assistant Examiner*—Tri V Nguyen
(74) *Attorney, Agent, or Firm*—Oliff & Berridge, PLC

(57) ABSTRACT

The present invention is directed to a fluoropolymer tape having an electrically conductive surface. More specifically, the present invention is directed to a polytetrafluoroethylene (PTFE) tape and method for producing an electrically conductive tape by blending vapor-grown carbon fiber or carbon nanotubes or combinations of both with PTFE.

15 Claims, 2 Drawing Sheets

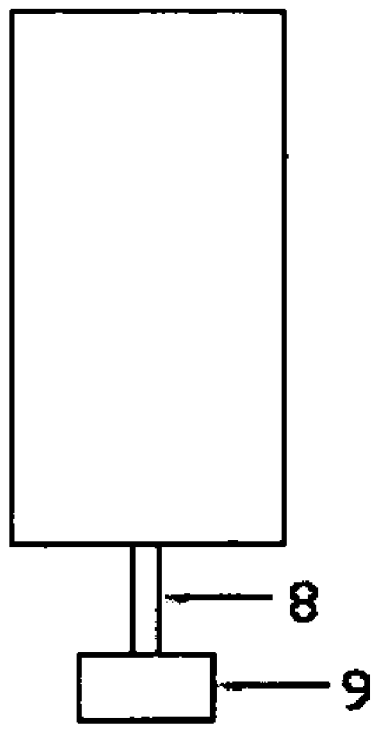
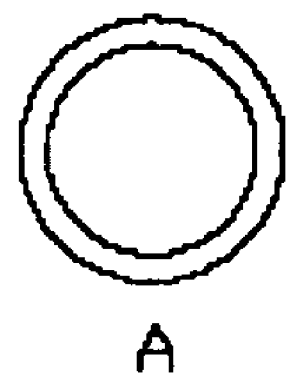
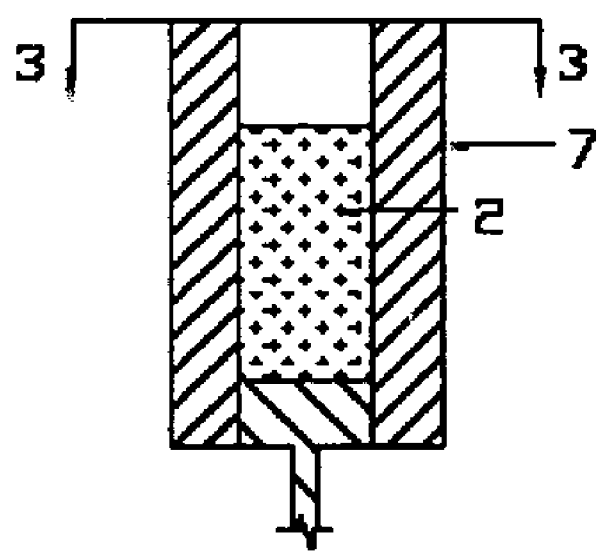
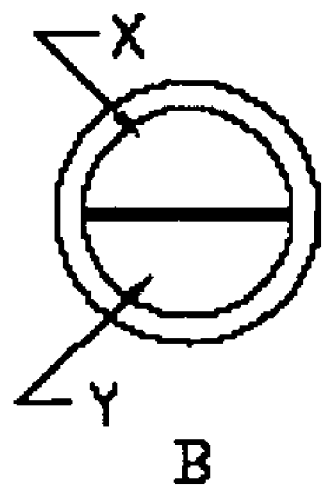
FIG.2
FIG.3

ELECTRICALLY CONDUCTIVE PTFE TAPE

RELATED APPLICATIONS

This application claims the benefit of U.S. Provisional Patent Application Ser. No. 60/566,632, filed Apr. 29, 2004, and of U.S. Provisional Patent Application Ser. No. 60/566,633, filed Apr. 29, 2004, which are incorporated herein by reference.

FIELD OF THE INVENTION

The present invention is directed to producing an electrically conductive polytetrafluoroethylene (PTFE) tape.

BACKGROUND OF THE INVENTION

U.S. Pat. No. 6,384,128 discloses a composition of various thermoplastic resins blended with an electrically conductive fiber and carbon powders in single or double-screw extruders that melt, knead and extrude the mixtures.

U.S. Pat. No. 6,528,572 discloses conductive fillers such as carbon fibers or carbon black with antistatic agents in a wide variety of thermoplastic resins.

U.S. Pat. No. 6,689,835 discloses a conductive, polymeric composition comprising a polymeric resin and an electrically conductive filler system comprising small carbon fibers and either carbon powder or fibrous non-conductive filler or a combination of both.

Patent Application Publication US 2003/0068550 discloses an electrode composed of a carbon material/electroconductive polymer composite is coated with an electro-conductive polymer.

Patent Application Publication US 2003/0158323 discloses methods to effectively disperse single wall carbon nanotubes and multi wall carbon nanotubes (CNTs) into polymers.

Patent Application Publication US 2003/0181568 discloses compositions similar to U.S. Pat. No. 6,689,835.

Patent Application Publication US 2004/0028859 discloses an electrically conductive and/or electromagnetic radiation absorptive coating composition having a water emulsion polymer binder.

Patent Application Publication US 2004/0029706 discloses a ceramic nano-composite comprising a ceramic host and a nano-structured carbon material.

Patent Application Publication US 2004/0077771 discloses compositions similar to U.S. Pat. No. 6,384,128.

Patent Application Publication US 2004/0262581 discloses methods for manufacturing compositions comprising polymeric resins, carbon nanotubes and an optional plasticizer.

Patent Application Publication US 2005/0038225 discloses compositions comprising organic polymers and a single wall carbon nanotube (SWNT) composition that are manufactured by adding the SWNTs to the polymer precursors either prior to or during the process of polymerization of the polymer precursor.

SUMMARY OF THE INVENTION

The present invention is directed to a fluoropolymer tape having an electrically conductive surface. More specifically, the present invention is directed to a polytetrafluoroethylene (PTFE) tape and method for producing an electrically conductive tape by blending vapor-grown carbon fiber or carbon nanotubes or combinations of both with PTFE.

BRIEF DESCRIPTION OF THE DRAWINGS

FIG. 2 is a schematic drawing for producing a PTFE preform for use. in a paste extrusion process; and FIG. 3 is a modification to the device for producing a PTFE preform for use in a paste extrusion process.

BRIEF DESCRIPTION OF THE PREFERRED EMBODIMENTS OF THE PRESENT INVENTION

Figure 1:
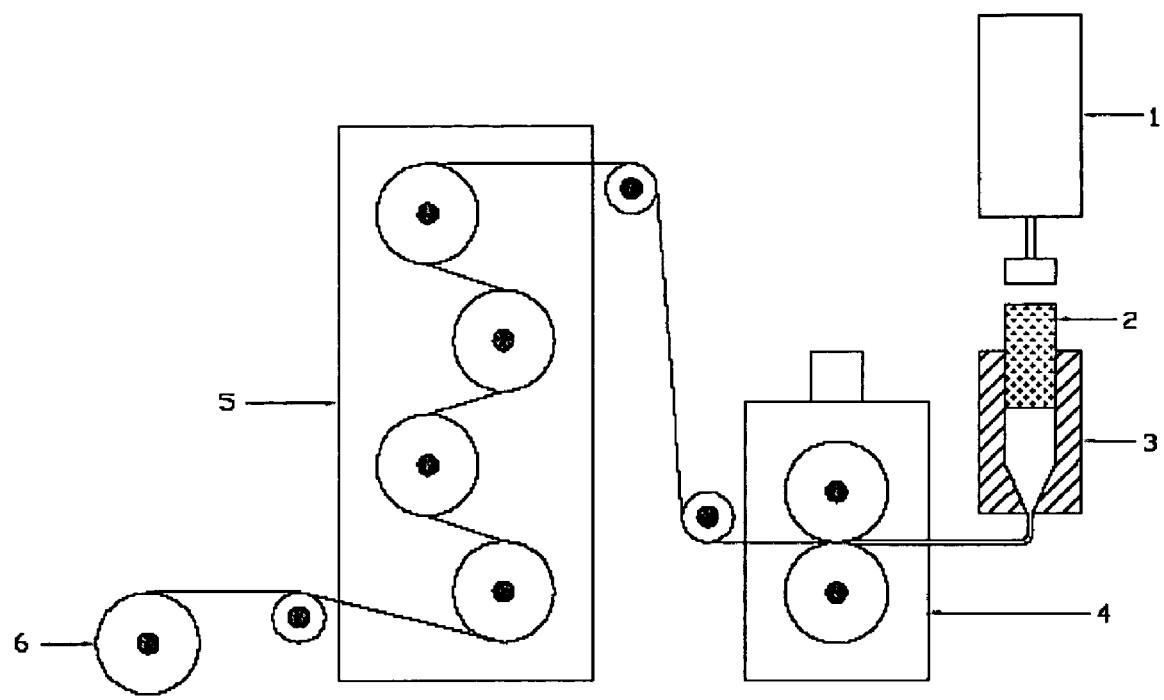
FIG. 1 is a schematic drawing of a typical paste extrusion process for producing PTFE tape.

The preferred embodiment of the present invention relates to an electrically conductive polytetrafluoroethylene (PTFE) tape and the method by which to produce the same. PTFE is one of a unique niche of fluoropolymers, including perfluoroalkoxy copolymer (PFA); ethylene tetrafluoroethylene copolymer (ETFE); poly(chlorotrifluoroethylene) (PCTFE); fluorinated ethylene propylene copolymer (FEP); poly(vinylidene fluoride) (PVDF); amorphous fluoropolymer (AF); and ethylene chlorotrifluoroethylene (ECTFE) that may be used to produce an electrically conductive tape. PTFE as a polymer forms an extremely inert tape. The carbon-fluorine bond with a dissociation energy of 460 kj/mol is one of the strongest bonds known in organic chemistry, and can be dissolved only under extreme conditions (e.g. heat exceeding 1000° F.). This inert property of PTFE has made it a polymer of choice in handling strong acids such as in battery construction, fuel cells and the like. A PTFE tape, as defined herein, is a sheet having two surfaces and having a thickness of about 0.001 to about 0.100 inches.

The preferred method for producing an electrically conductive fluoropolymer tape is by paste extrusion; however, tapes may be made by film casting. In both processes, the carbon must be dispersed with the fluoropolymer, preferably PTFE. In attempting to use carbon black to produce an electrically conductive tape, it was found that by adding about 20% carbon black to PTFE, which is necessary to achieve realistic conductivity, the viscosity of the mixture is too high to produce tape by normal paste extrusion methodology. Furthermore, the physical properties (e.g. tensile strength and elongation) of the PTFE tape are significantly diminished.

PTFE resin is commercially produced as a coagulated dispersion polymer (a fine uniform powder), the preferred resin for use in the present invention, or a granular powder.

The preferred carbon for the present invention is a vapor-grown fiber (VGCF). Carbon nanotubes may also be used. Carbon nanotubes may be single-wall carbon nanotube (SWNT) or multi-wall carbon nanotube (MWNT) or mixtures thereof. It was found that nanotubes are not easily dispersible with PTFE without first being treated using an ultrasonic method. In the manufacture of the nanotubes, the SWNT or MWNT adhere to one another or bundle, believed to be by Van der Waals force. This bundling causes a non-uniform carbon, i.e. rather than a carbon of a uniform nanometer (nm) size, the bundled carbon acts in the dispersion with PTFE as a carbon of much larger size, having characteristics of the much larger size carbon in carbon black. The ultrasonic method employed to produce the dispersible, uniform carbon is to place the nanotube, either SWNT or MWNT, in a lubricant, preferably an isoparaffinic solvent, used in the paste extrusion process. The nanotube and lubricant mixture, in a glass vessel, are placed in a 40~70 KHz water bath sonicator for a period of time, typically 10 minutes to 48 hours. After the ultrasonication process the nanotubes are dispersible with the PTFE resin and the mixture is extruded in the paste extrusion process.

It was found that the manufacturing process for some VGCFs had the bundling characteristics of nanotubes, and similarly the VGCF may be treated in a water bath sonicator to produce a dispersible carbon with the PTFE resin.

The preferred method of dispersing the carbon, either VGCF or ultrasonic treated SWNT, MWNT or VGCF with the PTFE is in a tumbling device, such as a Gemco, a Turbula Shaker-Mixer, in preparation for producing the paste for the paste extrusion process. The carbon and PTFE are tumbled in the desired concentrations with addition of a lubricant. The lubricant is preferably an isoparaffinic solvent; however, N,N dimethyl formamide (DMF); dodecylbenzenesulfonic acid (DDBS); sodium dodecyl sulfate (SDS); 12-aminododecanic acid; tetrahydrofuran (THF); or O-dichlorobenzene (ODCB) may be used. If the carbon has been dispersed by the ultrasonication process, the lubricant used with the carbon may be added directly to the tumbling device. If necessary, after tumbling, the mixture is further blended with a high shearing equipment.

Referring now to FIG. 1, an extruder 1 forces a preform 2 through a die 3. Die 3 may be a conical die, a fish tail die, a coat hanger die or a special proprietary die, each of which directly or indirectly form a sheet that is introduced between two rollers in a calendar 4. The sheet is then transported by rollers to a series of rollers, four rollers illustrated, in an evaporation oven. In the oven may be baffles, not shown, that permit the temperature surrounding each roller to be regulated and the evaporated lubricant to be removed from the oven in an effective and safe environment. The sheet is removed from the oven 5 and wound on a winder 6 as the finished tape. The rollers in the evaporation oven 5 may operate at independent speeds to elongate and reduce the thickness of the sheet as it passes through oven 5 to obtain the finished tape of the desired thickness. What is illustrated in FIG. 1 is a conventional commercial paste extrusion process.

Referring now to FIG. 2, apparatus for producing the preform 2 is illustrated. The specific apparatus will depend on automation and volume or it may be apparatus which is hand controlled by a person. The operation is to place a desired amount of the blended mixture of PTFE, carbon and lubricant in the concentrations of a desired paste to fill a press 7. A piston 8 having a head 9 of essentially the same dimensions of the press 7 compacts the paste into a preform 2. As a compacted preform 2, the preform 2 may be handled as a single structure and introduced to die 3. To illustrate the present invention, the following examples are given:

EXAMPLE 1

This example illustrates one of the preferred embodiments wherein the preferred carbon is VGCF.

In a tumbling device, 5-7 wt % of VGCF and 65-75 wt % PTFE is tumbled 30 to 60 minutes. During tumbling 15 to 25 wt % lubricant is sprayed into the blend. Alternatively, the lubricant may be sprayed to the mixture of VGCF and PTFE before tumbling. After tumbling, the premixed blend is sifted over a No. 10 sieve, with an aperture size of 2.00 millimeter (mm) to remove larger clumps. The premixed blend is then placed in plastic bags under ambient conditions for at least 24 to 48 hours before continuing the paste extrusion process.

The premixed blend is then placed into a press under 400-900 psi to make the preform, which is then extruded under 900-1800 psi. The extruded sheet is calendared and introduced into a four heating zone evaporation oven. The calendaring speed is about 11 foot/min and the heating zones are 425°, 465°, 525° and 530° F. respectively. A tape with a thickness of 4 to 8 mil is made.

The surface resistivity of the tape is in the range of $10^5 \sim 10^3$ ohm/square. The axial strength is 1000~3000 psi and the axial elongation is 100~300%; the transverse tensile strength is 600~1000 psi and the transverse elongation is 500~800%. To obtain a stronger tape, the tape as produced can be sintered. During the sintering process, the tape is heated for a sufficiently long period above the melting point of 327° C. for PTFE to pass the gel state. After sintering, the surface resistivity of the tape decreases up to $10^2$ ohm/square. The axial tensile strength is 4000~7000 psi and the axial elongation is 100~250%; the transverse tensile strength is 3000~5000 psi and the transverse elongation is 200~400%.

EXAMPLE 2

This example illustrates one of the preferred embodiments wherein the carbon is nanotubes.

1~2 wt % of carbon nanotubes, 20~30 wt % of a isoparaffinic solvent, and 0.1~0.5 wt % of a low boiling aliphatic alcohol are placed in a container. The mixture is placed in a 40~70 KHz water bath sonicator for 1 hour. Then the mixture with 60 to 75 wt % PTFE is tumbled in a tumbling device. After tumbling, the mixture is further blended with a high shearing rate equipment, The mixture is sieved, sealed and stored at ambient conditions for at least 24 hours.

The tape paste extrusion procedure is similar to that described in Example 1 except that the extrusion pressure is lower and in the range of 900~1200 psi.

The surface resistivity of the tape is in the range of $10^5 \sim 10^3$ ohm/square. The axial strength is 500~2000 psi and the axial elongation is 100~300%; the transverse tensile strength is 300~1000 psi and the transverse elongation is 500~800%. After sintering, the surface resistivity of the tape increases up to $10^2$ ohm/square. The axial tensile strength is 3000~7000 psi and the axial elongation is 50~250%; the transverse tensile strength is 800~5000 psi and the transverse elongation is 100~400%.

EXAMPLE 3

This example illustrates one of the preferred embodiments wherein the carbon is a mixture of VGCF and nanotubes.

Both the VGCF and nanotubes are pretreated by placing a mixture in a container and placing in a 40~70 KHz water bath sonicator for 1 hour. The tape paste extrusion procedure is similar to that described in Example 2.

Referring now to FIG. 3A and 3B, the cross section of press 7 is normally as shown in FIG. 3A in that a single paste of PTFE, carbon and lubricant is introduced to press 7. The PTFE tape will have the same electrical conductivity on both sides of the sheet. However, a modified tape is made when a baffle is used in press 7 as illustrated in FIG. 3B. A modified tape may have different electrical conductivity on each side of the sheet or one side with electrical conductivity and the other side with no electrical conductivity.

EXAMPLE 4

This example illustrates a modified PTFE tape.

In a press 7 having a baffle to separate two premixed blends as illustrated in FIG. 3B, one blend having the composition of Example 1 fills X and a second blend of PTFE having no carbon (a commercial blend of PTFE as presently used) fills Y. The baffle is removed for the piston to enter the press to form a preform. In the extrusion process a die is used to maintain the orientation of the two blends so that one is on top of the produced sheet and the other is on the bottom. The tape produced has one surface with electrical conductivity and the other with an electrical conductivity much different. Variations of modified tape are possible.

The tapes of the present invention have significant potential application in the battery and fuel cell industry, medical industry, aerospace industry, automotive industry pipeline, cables, pumps, valves, compressors and industrial seals. The tapes may be used for electromagnetic shielding, electrostatic dissipation or antistatic purposes. The tapes may be wound on a mandrel unsintered to form tubes that when sintered may carry fluids.

The invention claimed is:

1. A fluoropolymer tape having two sides, at least one of the sides being an electrically conductive extrusion of a blended mixture, the blended mixture comprising dispersible carbon selected from the group consisting of vapor-grown carbon fibers (VGCF), and combinations of VGCF and carbon nanotubes and polytetrafluoropolymer;
   wherein the sides comprise extrusions of different blended mixtures and wherein one side of the tape is more electrically conductive than the other side of the tape.

2. The tape of claim 1 wherein the blended mixture comprises from 60 wt % to 75 wt % polytetrafluoroethylene (PTFE).

3. The tape of claim 1 wherein the dispersible carbon is vapor-grown carbon fiber, VGCF.

4. The tape of claim 1 wherein the dispersible carbon is a mixture of vapor-grown carbon fiber and carbon nanotube.

5. The tape of claim 3 wherein the blended mixture comprises from 5 wt % to 7 wt % VGCF and from 65 wt % to 75 wt % PTFE.

6. The tape of claim 1 wherein the other side of the tape has no electrical conductivity.

7. The polyfluoropolymer tape of claim 1 wherein the extrusion is formed by extrusion past at least one die comprising a baffle whereby the blended mixture of the at least one side of the tape is separated from the other side of the tape during extrusion.

8. A PTFE tape having two sides, at least one of the sides being an electrically conductive extrusion of a blended mixture comprising dispersible carbon selected from the group consisting of vapor-grown carbon fibers (VGCF), and combinations of VGCF and carbon nanotubes and PTFE;
   wherein the sides comprise extrusions of different blended mixtures and wherein one side of the tape is more electrically conductive than the other side of the tape.

9. The tape of claim 8 wherein the dispersible carbon is formed from bundled carbon by placing the bundled carbon and an isoparaffinic solvent in a sonicator and subjecting the mixture of bundled carbon and isoparaffinic solvent to ultrasonic frequency for a period of time.

10. The tape of claim 9 wherein the isoparaffinic solvent is selected from the group consisting of N,N dimethyl formamide (DMF); dodecylbenzenesulfonic acid (DDB); sodium dodecyl sulfate (SDS); 12-aminododecanoic acid; tetrahydrofuran (THF); and O-dichlorobenzene (ODCB).

11. The tape of claim 8 wherein the dispersible carbon is vapor-grown carbon fiber, and the blended mixture comprises from 5 wt % to 7 wt % VGCF and from 65 wt % to 75 wt % PTFE.

12. The tape of claim 8 wherein the dispersible carbon is vapor-grown carbon fiber and the axial strength of the tape is from 1000 psi to 2000 psi.

13. The tape of claim 8 wherein the dispersible carbon is vapor-grown carbon fiber and, upon sintering of the tape, the axial tensile strength of the tape is from 4000 psi to 7000 psi.

14. The tape of claim 8 wherein the blended mixtures further comprises from 15 wt % to 25 wt % of an isoparaffinic solvent, and wherein, upon evaporation of the solvent, the tape consists essentially of from 6 wt % to 11 wt % VGCF and from 89 wt % to 94 wt % PTFE.

15. The tape of claim 8 wherein the percentage by weight of the dispersible carbon in the mixture yields a tape having a surface resistivity in the range of from $10^3$ to $10^5$ ohms per square

* * * * *